(12) United States Patent
Graff et al.

(10) Patent No.: US 12,730,279 B2
(45) Date of Patent: Sep. 8, 2026

(54) OPTICAL MODULE INCLUDING METASURFACE CHIP AND METHODS OF MANUFACTURING THEREOF

(71) Applicant: Metalenz, Inc., Boston, MA (US)

(72) Inventors: John Graff, Swampscott, MA (US); Carlos Calvo, Boston, MA (US); Ran Zhang, Boston, MA (US); Richard Norton, Boston, MA (US)

(73) Assignee: Metalenz, Inc., Boston, MA (US)

( * ) Notice: Subject to any disclaimer, the term of this patent is extended or adjusted under 35 U.S.C. 154(b) by 674 days.

(21) Appl. No.: 18/148,869

(22) Filed: Dec. 30, 2022

(65) Prior Publication Data

US 2023/0213726 A1 Jul. 6, 2023

Related U.S. Application Data

(60) Provisional application No. 63/266,201, filed on Dec. 30, 2021.

(51) Int. Cl.
*G02B 7/02* (2021.01)

(52) U.S. Cl.
CPC .................................... *G02B 7/02* (2013.01)

(58) Field of Classification Search
CPC ........ G02B 7/02; G02B 5/201; G02B 5/1857; G02B 1/002
USPC ........................................................ 359/811
See application file for complete search history.

(56) References Cited

U.S. PATENT DOCUMENTS 5,519,522 A * 5/1996 Fergason ................ B23K 9/32 359/359
6,097,856 A 8/2000 Hammond, Jr.
6,731,839 B2 5/2004 Bhagavatula et al.
6,825,986 B2 11/2004 Ashkinazy et al.
6,924,457 B2 8/2005 Koyama et al.
6,927,922 B2 8/2005 George et al.
7,061,693 B2 6/2006 Zalevsky
7,171,078 B2 1/2007 Sasaki et al.
(Continued)

FOREIGN PATENT DOCUMENTS

CN 100476504 C 4/2009
CN 101510013 B 6/2010
(Continued)

OTHER PUBLICATIONS

International Preliminary Report on Patentability for International Application PCT/US2022/082649, Report issued Jun. 20, 2024, Mailed on Jul. 11, 2024, 8 pgs.
(Continued)

*Primary Examiner* — William R Alexander
(74) *Attorney, Agent, or Firm* — KPPB LLP

(57) ABSTRACT

Disclosed herein is metasurface modules configured to reduce the cost of integration of metasurface elements within a housing and methods of manufacturing thereof. One particular embodiment includes a metasurface module including: a secondary substrate; and a metasurface chip mounted on the secondary substrate. The secondary substrate laterally extends from all sides of the metasurface chip to completely surround the metasurface chip. The secondary substrate may be utilized to mount the metasurface chip within a housing which decreases the size of the metasurface chip and ultimately decreases manufacturing costs of the metasurface chip.

12 Claims, 19 Drawing Sheets

(56) References Cited

U.S. PATENT DOCUMENTS 7,171,084 B2 1/2007 Izumi et al.
7,186,969 B2 3/2007 Altendorf et al.
7,241,988 B2 7/2007 Gruber et al.
7,324,210 B2 1/2008 De et al.
7,327,468 B2 2/2008 Maznev et al.
7,402,131 B2 7/2008 Mueth et al.
7,450,618 B2 11/2008 Dantus et al.
7,547,874 B2 6/2009 Liang
7,561,264 B2 7/2009 Treado et al.
7,576,899 B2 8/2009 Kanesaka et al.
7,679,830 B2 3/2010 Dowski, Jr.
7,684,097 B2 3/2010 Fukumoto et al.
7,773,307 B2 8/2010 Shih
7,800,683 B2 9/2010 Zalevsky et al.
7,812,295 B2 10/2010 Zalevsky et al.
7,929,220 B2 4/2011 Sayag
7,965,607 B2 6/2011 Fukumoto et al.
8,009,358 B2 8/2011 Zalevsky et al.
8,040,604 B2 10/2011 Zalevsky et al.
8,107,705 B2 1/2012 Dowski, Jr. et al.
8,152,307 B2 4/2012 Duelli et al.
8,169,703 B1 5/2012 Mossberg et al.
8,192,022 B2 6/2012 Zalevsky
8,212,866 B2 7/2012 Lemmer et al.
8,318,386 B2 11/2012 Kobrin
8,351,048 B2 1/2013 Millerd
8,351,120 B2 1/2013 Deng et al.
8,390,932 B2 3/2013 Jia et al.
8,430,513 B2 4/2013 Chang et al.
8,451,368 B2 5/2013 Sung et al.
8,472,797 B2 6/2013 Ok et al.
8,558,873 B2 10/2013 Mceldowney
8,649,631 B2 2/2014 Islam et al.
8,687,040 B2 4/2014 Silveira
8,734,033 B2 5/2014 Walters et al.
8,816,460 B2 8/2014 Kalevo et al.
8,876,289 B2 11/2014 Diaz et al.
8,908,149 B2 12/2014 Freimann
9,007,451 B2 4/2015 Rogers et al.
9,212,899 B2 12/2015 Johnson et al.
9,309,274 B2 4/2016 Van Der Boom et al.
9,310,535 B1 4/2016 Greiner et al.
9,329,484 B1 5/2016 Markle et al.
9,330,704 B2 5/2016 Nishimura et al.
9,367,036 B2 6/2016 Pyun et al.
9,369,621 B2 6/2016 Malone et al.
9,392,153 B2 7/2016 Myhre et al.
9,606,415 B2 3/2017 Zheludev et al.
9,609,190 B2 3/2017 Lee et al.
9,766,463 B2 9/2017 Border et al.
9,778,404 B2 10/2017 Divliansky et al.
9,825,074 B2 11/2017 Tian et al.
9,829,700 B2 11/2017 Parent et al.
9,835,870 B2 12/2017 Astratov et al.
9,836,122 B2 12/2017 Border
9,869,580 B2 1/2018 Grossinger et al.
9,880,377 B1 1/2018 Safrani et al.
9,885,859 B2 2/2018 Harris
9,891,393 B2 2/2018 Reece
9,947,118 B2 4/2018 Khare et al.
9,958,251 B1 5/2018 Brock et al.
9,967,541 B2 5/2018 Piestun
9,978,801 B2 5/2018 Park et al.
9,989,680 B2 6/2018 Arbabi et al.
9,995,859 B2 6/2018 Kamali et al.
10,007,118 B2 6/2018 Border
10,054,859 B2 8/2018 Ye et al.
10,108,085 B2 10/2018 Peters et al.
10,126,466 B2 11/2018 Lin et al.
10,149,612 B2 12/2018 Muyo et al.
10,254,454 B2 4/2019 Klug et al.
10,267,957 B2 4/2019 Kamali et al.
10,310,148 B2 6/2019 Stewart et al.
10,310,387 B2 6/2019 Palmer et al.
10,317,667 B2 6/2019 Waller et al.
10,324,314 B2 6/2019 Czaplewski et al.
10,338,275 B1 7/2019 Acosta et al.
10,341,640 B2 7/2019 Shechtman et al.
10,345,246 B2 7/2019 Tian et al.
10,345,519 B1 7/2019 Miller et al.
10,365,416 B2 7/2019 Zhan et al.
10,371,936 B2 8/2019 Didomenico
10,386,620 B2 8/2019 Astratov et al.
10,402,993 B2 9/2019 Han et al.
10,416,565 B2 9/2019 Ahmed et al.
10,440,244 B2 10/2019 Rosenblatt et al.
10,440,300 B2 10/2019 Rephaeli et al.
10,466,394 B2 11/2019 Lin et al.
10,468,447 B2 11/2019 Akselrod et al.
10,514,296 B2 12/2019 Han et al.
10,527,832 B2 1/2020 Schwab et al.
10,527,851 B2 1/2020 Lin et al.
10,536,688 B2 1/2020 Haas et al.
10,539,723 B2 1/2020 Iazikov et al.
10,545,323 B2 1/2020 Schwab et al.
11,385,516 B2 7/2022 Didomenico
2002/0048727 A1 4/2002 Zhou et al.
2003/0107787 A1 6/2003 Bablumyan
2005/0239003 A1 10/2005 Chiodini et al.
2006/0042322 A1 3/2006 Mendoza et al.
2012/0140235 A1 6/2012 Lee et al.
2012/0258407 A1 10/2012 Sirat
2015/0055745 A1 2/2015 Holzner et al.
2016/0077261 A1 3/2016 Arbabi et al.
2016/0195705 A1 7/2016 Betzig et al.
2016/0331457 A1 11/2016 Varghese et al.
2016/0341859 A1 11/2016 Shvets et al.
2016/0361002 A1 12/2016 Palikaras et al.
2017/0038574 A1 2/2017 Zhuang et al.
2017/0125911 A1 5/2017 Alu et al.
2017/0131460 A1 5/2017 Lin et al.
2017/0250577 A1 8/2017 Ho et al.
2017/0299784 A1 10/2017 Mikkelsen et al.
2017/0307794 A1* 10/2017 Hunter .................. G02C 7/104
2017/0329201 A1 11/2017 Arnold
2018/0035101 A1 2/2018 Osterhout
2018/0044234 A1 2/2018 Hokansson et al.
2018/0107015 A1 4/2018 Dümpelmann et al.
2018/0217395 A1 8/2018 Lin et al.
2018/0231700 A1 8/2018 Ahmed et al.
2018/0236596 A1 8/2018 Ihlemann et al.
2018/0248268 A1 8/2018 Shvets et al.
2018/0252857 A1 9/2018 Glik et al.
2018/0259700 A1 9/2018 Khorasaninejad et al.
2018/0259757 A1 9/2018 Urzhumov
2018/0267605 A1 9/2018 Border
2018/0314130 A1 11/2018 Joo et al.
2019/0025463 A1 1/2019 She et al.
2019/0041642 A1 2/2019 Haddick et al.
2019/0044003 A1 2/2019 Heck et al.
2019/0049632 A1 2/2019 Shin et al.
2019/0049732 A1 2/2019 Lee et al.
2019/0057512 A1 2/2019 Han et al.
2019/0064532 A1* 2/2019 Riley, Jr. ................. H01S 5/423
2019/0086579 A1 3/2019 Kim et al.
2019/0101448 A1 4/2019 Lee et al.
2019/0113775 A1 4/2019 Jang et al.
2019/0120817 A1 4/2019 Anderson
2019/0121004 A1 4/2019 Ahmed et al.
2019/0137793 A1 5/2019 Luo et al.
2019/0154877 A1 5/2019 Capasso et al.
2019/0170655 A1 6/2019 Smith
2019/0206136 A1 7/2019 West et al.
2019/0219835 A1 7/2019 Skinner et al.
2019/0235139 A1 8/2019 Chen et al.
2019/0250107 A1 8/2019 Sreenivasan et al.
2019/0369401 A1 12/2019 Rolland et al.
2019/0377084 A1 12/2019 Sleasman et al.
2019/0391378 A1 12/2019 Eichelkraut et al.
2020/0025888 A1 1/2020 Jang et al.
2020/0259307 A1* 8/2020 Sharma ................. H01S 5/3432
2020/0271941 A1* 8/2020 Riley, Jr. .............. G02B 27/106
2020/0284960 A1* 9/2020 Ellenbogen .............. G02B 5/20
2021/0028215 A1* 1/2021 Devlin ................ H10F 39/8053

(56) References Cited

U.S. PATENT DOCUMENTS

2021/0190593 A1 6/2021 Yao
2021/0208469 A1 7/2021 Didomenico
2022/0052093 A1* 2/2022 Devlin ................. H10F 39/804
2022/0214219 A1 7/2022 Faraon et al.

FOREIGN PATENT DOCUMENTS

CN 101510012 B 8/2010
CN 101510011 B 9/2010
CN 101241173 B 8/2011
CN 202854395 U 4/2013
CN 103092049 A 5/2013
CN 203799117 U 8/2014
CN 204719330 U 10/2015
CN 103869484 B 1/2016
CN 103257441 B 10/2016
CN 205620619 U 10/2016
CN 104834079 B 4/2017
CN 104834089 B 6/2017
CN 106200276 B 10/2017
CN 104834088 B 12/2017
CN 105676314 B 1/2018
CN 107561857 A 1/2018
CN 108089325 A 5/2018
CN 207623619 U 7/2018
CN 106199997 B 8/2018
CN 108507542 A 9/2018
CN 207923075 U 9/2018
CN 108680544 A 10/2018
CN 108761779 A 11/2018
CN 109000692 A 12/2018
CN 208270846 U 12/2018
CN 106199956 B 2/2019
CN 109360139 A 2/2019
CN 106950195 B 5/2019
CN 106324832 B 7/2019
CN 106526730 B 7/2019
CN 106485761 B 8/2019
CN 110160685 A 8/2019
CN 110678773 A 1/2020
CN 213092332 U 4/2021
CN 113050295 A 6/2021
CN 110376665 B 8/2021
CN 213902664 U 8/2021
CN 213903843 U 8/2021
CN 214098104 U 8/2021
CN 113703080 A 11/2021
CN 113791524 A 12/2021
CN 113807312 A 12/2021
CN 113820839 A 12/2021
CN 113834568 A 12/2021
CN 113835227 A 12/2021
CN 113851573 A 12/2021
CN 215005942 U 12/2021
CN 215010478 U 12/2021
CN 110494771 B 1/2022
CN 113885106 A 1/2022
CN 113899451 A 1/2022
CN 113900078 A 1/2022
CN 113900162 A 1/2022
CN 113917574 A 1/2022
CN 113917578 A 1/2022
CN 113934004 A 1/2022
CN 113934005 A 1/2022
CN 113959984 A 1/2022
CN 114002707 A 2/2022
CN 114019589 A 2/2022
CN 114047632 A 2/2022
CN 114047637 A 2/2022
CN 114112058 A 3/2022
CN 114156168 A 3/2022
CN 114176492 A 3/2022
CN 215932365 U 3/2022
CN 114280704 A 4/2022
CN 114280716 A 4/2022
CN 114296180 A 4/2022
CN 114325886 A 4/2022
CN 114326163 A 4/2022
CN 114354141 A 4/2022
CN 114373825 A 4/2022
CN 114384612 A 4/2022
CN 114397092 A 4/2022
CN 114397718 A 4/2022
CN 114415386 A 4/2022
CN 216345776 U 4/2022
CN 216351311 U 4/2022
CN 216351591 U 4/2022
CN 216355281 U 4/2022
CN 216361353 U 4/2022
CN 114488365 A 5/2022
CN 114543993 A 5/2022
CN 114545367 A 5/2022
CN 114545370 A 5/2022
CN 114554062 A 5/2022
CN 114561266 A 5/2022
CN 216593224 U 5/2022
CN 216605227 U 5/2022
CN 216622749 U 5/2022
CN 114578642 A 6/2022
CN 114593689 A 6/2022
CN 114623960 A 6/2022
CN 114624878 A 6/2022
CN 114660683 A 6/2022
CN 114660780 A 6/2022
CN 114690387 A 7/2022
CN 114740631 A 7/2022
CN 114743714 A 7/2022
CN 114779437 A 7/2022
CN 216896898 U 7/2022
CN 216900930 U 7/2022
CN 216901121 U 7/2022
CN 216901165 U 7/2022
CN 216901317 U 7/2022
CN 216901952 U 7/2022
CN 216903719 U 7/2022
CN 216933177 U 7/2022
CN 217034311 U 7/2022
CN 217034418 U 7/2022
CN 217034466 U 7/2022
CN 114859446 A 8/2022
CN 114859447 A 8/2022
CN 114859570 A 8/2022
CN 114935741 A 8/2022
CN 217276608 U 8/2022
CN 217278911 U 8/2022
CN 217278915 U 8/2022
CN 217278989 U 8/2022
CN 217279003 U 8/2022
CN 217279087 U 8/2022
CN 217279110 U 8/2022
CN 217279168 U 8/2022
CN 217279244 U 8/2022
CN 217280797 U 8/2022
CN 217280851 U 8/2022
CN 217281621 U 8/2022
CN 217281623 U 8/2022
CN 114995038 A 9/2022
CN 115016099 A 9/2022
CN 115016150 A 9/2022
CN 115032766 A 9/2022
CN 115047432 A 9/2022
CN 115047653 A 9/2022
CN 115061114 A 9/2022
CN 115079415 A 9/2022
CN 115113174 A 9/2022
CN 217456368 U 9/2022
CN 217465697 U 9/2022
CN 217466052 U 9/2022
CN 217466667 U 9/2022
CN 217467162 U 9/2022
CN 217467176 U 9/2022
CN 217467177 U 9/2022
CN 217467226 U 9/2022
CN 217467326 U 9/2022

(56) References Cited

FOREIGN PATENT DOCUMENTS

CN 217467327 U 9/2022
CN 217467336 U 9/2022
CN 217467338 U 9/2022
CN 217467351 U 9/2022
CN 217467352 U 9/2022
CN 217467353 U 9/2022
CN 217467355 U 9/2022
CN 217467357 U 9/2022
CN 217467358 U 9/2022
CN 217467363 U 9/2022
CN 217467364 U 9/2022
CN 217467367 U 9/2022
CN 217467368 U 9/2022
CN 217467395 U 9/2022
CN 217467396 U 9/2022
CN 217467399 U 9/2022
CN 217467439 U 9/2022
CN 217467452 U 9/2022
CN 115164714 A 10/2022
CN 115166876 A 10/2022
CN 115166958 A 10/2022
CN 115185082 A 10/2022
CN 115211799 A 10/2022
CN 115236795 A 10/2022
CN 217639515 U 10/2022
CN 217639519 U 10/2022
CN 217639539 U 10/2022
CN 217639544 U 10/2022
CN 217639611 U 10/2022
CN 217639612 U 10/2022
CN 217639613 U 10/2022
CN 217639715 U 10/2022
CN 217639718 U 10/2022
CN 217639719 U 10/2022
CN 217639720 U 10/2022
CN 217639722 U 10/2022
CN 217639723 U 10/2022
CN 217639724 U 10/2022
CN 217639725 U 10/2022
CN 217639726 U 10/2022
CN 217639763 U 10/2022
CN 217639765 U 10/2022
CN 217639767 U 10/2022
CN 217639768 U 10/2022
CN 217639769 U 10/2022
CN 217639770 U 10/2022
CN 217639771 U 10/2022
CN 217639772 U 10/2022
CN 217639773 U 10/2022
CN 217639774 U 10/2022
CN 217639776 U 10/2022
CN 217639777 U 10/2022
CN 217639778 U 10/2022
CN 217639903 U 10/2022
CN 217639920 U 10/2022
CN 115268058 A 11/2022
CN 115327865 A 11/2022
CN 115332917 A 11/2022
CN 115343795 A 11/2022
CN 115390176 A 11/2022
CN 217809433 U 11/2022
CN 217818613 U 11/2022
CN 217819022 U 11/2022
CN 217820828 U 11/2022
CN 217820829 U 11/2022
CN 217820831 U 11/2022
CN 217820834 U 11/2022
CN 217820838 U 11/2022
CN 217820839 U 11/2022
CN 217820840 U 11/2022
CN 217820943 U 11/2022
CN 217820944 U 11/2022
CN 217820945 U 11/2022
CN 217820971 U 11/2022
CN 217821058 U 11/2022
CN 217821068 U 11/2022
CN 217821071 U 11/2022
CN 217821091 U 11/2022
CN 217821110 U 11/2022
CN 217821111 U 11/2022
CN 217821113 U 11/2022
CN 217821122 U 11/2022
CN 217821160 U 11/2022
CN 217821236 U 11/2022
CN 217821680 U 11/2022
CN 217821696 U 11/2022
CN 217822825 U 11/2022
CN 217823690 U 11/2022
CN 217825178 U 11/2022
CN 217885960 U 11/2022
CN 217902220 U 11/2022
CN 217902222 U 11/2022
CN 115421295 A 12/2022
CN 115453754 A 12/2022
CN 115524768 A 12/2022
CN 115524775 A 12/2022
CN 115524874 A 12/2022
CN 217981833 U 12/2022
CN 217981857 U 12/2022
CN 217981991 U 12/2022
CN 217981992 U 12/2022
CN 217982020 U 12/2022
CN 217982038 U 12/2022
CN 217982089 U 12/2022
CN 217982120 U 12/2022
CN 217983382 U 12/2022
CN 217984044 U 12/2022
CN 118475856 A 8/2024
DE 102007058558 A1 6/2009
DE 102012212753 A1 1/2014
DE 102015221985 A1 5/2017
DE 102016218996 A1 9/2017
EP 1251397 A2 10/2002
EP 1252623 B1 10/2004
EP 2338114 B1 3/2017
EP 3226042 A1 10/2017
EP 3385770 A1 10/2018
EP 4457549 A1 11/2024
GB 2499869 B 3/2018
JP 2017062373 A 3/2017
KR 20080099452 A 11/2008
KR 20080103149 A 11/2008
KR 20090002583 A 1/2009
KR 101493928 B1 3/2015
KR 20170015109 A 2/2017
KR 20180121309 A 11/2018
KR 101905444 B1 12/2018
KR 102036640 B1 10/2019
WO 2007141788 A2 12/2007
WO 2009124181 A2 10/2009
WO 2012172366 A1 12/2012
WO 2015077926 A1 6/2015
WO 2016051325 A1 4/2016
WO 2016191142 A2 12/2016
WO 2017005709 A1 1/2017
WO 2018118984 A1 6/2018
WO 2018134215 A1 7/2018
WO 2018142339 A1 8/2018
WO 2018204856 A1 11/2018
WO 2018218063 A1 11/2018
WO 2018219710 A1 12/2018
WO 2018222944 A1 12/2018
WO 2019015735 A1 1/2019
WO 2019039241 A1 2/2019
WO 2019043016 A1 3/2019
WO 2019057907 A1 3/2019
WO 2019075335 A1 4/2019
WO 2019101750 A2 5/2019
WO 2019108290 A1 6/2019
WO 2019116364 A1 6/2019
WO 2019118646 A1 6/2019
WO 2019119025 A1 6/2019
WO 2019136166 A1 7/2019
WO 2019148200 A1 8/2019

(56) References Cited

FOREIGN PATENT DOCUMENTS

| | | | |
|---|---|---|---|
| WO | 2019164542 | A1 | 8/2019 |
| WO | 2019164849 | A1 | 8/2019 |
| WO | 2019173357 | A1 | 9/2019 |
| WO | 2019198568 | A1 | 10/2019 |
| WO | 2019204667 | A1 | 10/2019 |
| WO | 2019206430 | A1 | 10/2019 |
| WO | 2020001938 | A1 | 1/2020 |
| WO | 2021255077 | A1 | 12/2021 |
| WO | 2023130087 | A1 | 7/2023 |

OTHER PUBLICATIONS

International Search Report and Written Opinion for International Application No. PCT/US2022/082649, Search completed Apr. 13, 2023, Mailed Apr. 24, 2023, 14 pgs.

* cited by examiner 114
116
108
104
108b
108a
112
102
110
116
106

508
504
506
502
500

802
804
1102
1302
1102
1302
1306
804
802
1308
1102
1302
1306
804
1310

OPTICAL MODULE INCLUDING METASURFACE CHIP AND METHODS OF MANUFACTURING THEREOF

CROSS-REFERENCE TO RELATED APPLICATIONS

This application claims the benefit of and priority under 35 U.S.C. § 119(e) to U.S. Provisional Patent Application Ser. No. 63/266,201, entitled "Optical Module Including Metasurface Chip and Methods of Manufacturing Thereof" and filed Dec. 30, 2021, which is incorporated herein by reference in its entirety for all purposes.

FIELD OF THE INVENTION

The present invention generally relates to optical modules including metasurface chips and methods of manufacturing thereof.

BACKGROUND

Wave-front shaping and beam-forming are procedures in which the spatial amplitude/phase distribution of the free-space propagating light can be tailored in order to create a desired beam pattern (e.g., focal spot, deflection, and holography). The traditional methods, widely used in industry, involve dielectric parabolic mirrors/lenses which are bulky, relatively heavy, and curved. These undesired features stem from the physical mechanism behind conventional optical lenses, which is the enforcement of different optical path lengths to accumulate distinct phase delays. In contrast, meta-surfaces include non-uniform subwavelength scatterers with capability of abrupt control over the reflection/transmission phase (0-2π) and amplitude (0-1) at the interface. These spatially varying phase shifts over the incident light can be realized by utilizing an array of unit-cells having carefully engineered constituent materials, geometry, orientation, and structural parameters.

In general, meta-surfaces as artificially structured materials can offer device miniaturization, planar and thin form, high spatial resolution, and opportunity of dense integration into optical devices. In addition, they have the potentials to be used for steering the beam propagation direction, shaping the wave-front of light, and imparting information for applications such as sensing, imaging, light detection, and ranging (e.g. LiDAR). Although there has been remarkable progress in the design of optical meta-surfaces as a promising replacement for conventional optical elements (e.g., gratings, lenses, holograms, wave-plates, polarizers, and spectral filters), there remain several limitations that have not been adequately addressed including the overall efficiency of the large-scale graded-pattern meta-surfaces. In particular, it may be beneficial to achieve highly efficient beam deflection engineering (e.g., maximizing the diffraction efficiency) in order to transfer the total intensity of the impinging light into a desired deflection angle. This can be considered as the underlying mechanism behind a wide range of optical imaging/sensing devices. Thus, it can have a significant impact on the next-generation of flat-lenses with not only low-cost fabrication, planar form factor, and compactness but also relatively high optical efficiency.

SUMMARY OF THE DISCLOSURE

Systems and methods in accordance with various embodiments of the invention can include a metasurface module including: a secondary substrate; and a metasurface chip mounted on the secondary substrate, wherein the secondary substrate laterally extends from all sides of the metasurface chip to completely surround the metasurface chip.

In various other embodiments, the metasurface chip has a minimal border region.

In still various other embodiments, the second substrate is coated with a coating.

In still various other embodiments, the coating is at least one selected from the group consisting of: an opaque optical aperture, an anti-reflection coating, an optical filter coating, an electrical circuit, and a conductive layer.

In still various other embodiments, the optical filter coating comprises at least one selected from the group consisting of: a high-pass coating, a low-pass coating, and a band-pass coating.

In still various other embodiments, the conductive layer is configured to provide eye safety.

In still various other embodiments, the coating includes patterned features and the metasurface chip is aligned with the patterned features.

In still various other embodiments, the metasurface chip is mounted to the secondary substrate by an optically transparent bond.

In still various other embodiments, the metasurface module, further includes a housing, wherein the secondary substrate is mounted to the housing.

Systems and methods in accordance with various embodiments of the invention can further include a metasurface module including a metasurface chip completely surrounded by a polymer material.

In various other embodiments, the polymer material is coplanar with a top surface of the metasurface chip.

In still various other embodiments, the metasurface chip has a minimal border region.

In still various other embodiments, the metasurface chip is coated with a coating.

In still various other embodiments, the coating is at least one selected from the group consisting of: an opaque optical aperture, an anti-reflection coating, an optical filter coating, an electrical circuit, and a conductive layer.

In still various other embodiments, the optical filter coating includes at least one selected from the group consisting of: a high-pass coating, a low-pass coating, and a band-pass coating.

In still various other embodiments, the conductive layer is configured to provide eye safety.

In still various other embodiments, the coating includes patterned features and the metasurface chip is aligned with the patterned features.

In still various other embodiments, the metasurface module further includes a housing, where the metasurface chip is mounted to the housing through the polymer material.

Systems and methods in accordance with various embodiments of the invention can further include a method of manufacturing an optical device, the method including: providing a metasurface chip; providing a secondary substrate, where the metasurface chip has smaller dimensions than the secondary substrate; and mounting the metasurface chip to the secondary substrate, where the metasurface chip completely overlaps with the secondary substrate.

In various other embodiments, the secondary substrate is a singular die that supports the metasurface chip.

In still various other embodiments, the secondary substrate is a wafer that is capable of supporting multiple metasurface chips, the method further includes singulating the secondary substrate into a singular die with the mounted metasurface chip.

In still various other embodiments, the metasurface chip has a minimal border region.

In still various other embodiments, the method further includes: providing a housing; and mounting the metasurface chip to the housing through the secondary substrate such that the secondary substrate directly contacts the housing.

In still various other embodiments, the metasurface chip does not contact the housing.

Systems and methods in accordance with various embodiments of the invention can further include a method of manufacturing an optical device, the method including: providing a metasurface chip; mounting the metasurface chip on a substrate; backfilling the metasurface chip with a polymer material such that the polymer material completely surrounds the metasurface chip and is coplanar with the top surface of the metasurface chip; and singulating the metasurface chip and polymer material completely surrounding the metasurface chip.

In various other embodiments, the method further includes curing the polymer material into a hard plastic.

In still various other embodiments, the metasurface chip has a minimal border region.

In still various other embodiments, the method further includes: providing a housing; mounting the metasurface chip to the housing through the polymer material such that the polymer material directly contacts the housing.

In still various other embodiments, the metasurface chip does not contact the housing.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Disclosed herein is an optical module including a metasurface chip and methods of manufacturing thereof. In some embodiments, the optical module may include multiple elements, including, for example, an optical element. The optical element may include metasurface optical element. The optical module may be a camera including an image sensor or the optical module may be an illuminator including a light source. The light source may include a laser. A low manufacturing cost of these optical elements may be commercially important for a successful product. For many optical elements (including metasurface optical elements), the manufacturing cost may be proportional to the chip size. For example, the optical elements may be fabricated on a wafer, where the cost of the wafer may be constant no matter how many elements fit on the wafer. Therefore, reducing the area of the chip may significantly reduce the cost of manufacturing the chip. In many configurations, the optical element may include an optically active region (e.g. the extent of the metasurface nanostructures on the metasurface optical element) on a transparent substrate/chip. It may be common that the area of the optically active region is substantially smaller than the transparent substrate/chip, primarily due to mechanical considerations of module construction. In some examples, the chip may be made bigger or smaller depending on the size of the housing in the optical module. Various disclosed embodiment can minimize the area of the optical element, while maintaining the ability to manufacture the module by enlarging the footprint of the optical module without wasting chip space.

Embodiments Including a Secondary Substrate

Described herein is a device and method minimizing the area (and therefore cost) of an optical element on a chip, while allowing for successful module integration. In this method and/or device, the optical element may be sized such that it is only marginally larger than the optically active surface. For example, if the optically active area is 1×1 mm, then the optical element can be 1.2×1.2 mm (providing a 0.1 mm border around the active surface). Subsequently, the optical element may be bonded to a second (and larger) transparent substrate (e.g. a module cover glass; handle wafer) using an optically transparent bond (e.g. a transparent adhesive, or direct glass-glass bond). The second substrate may be substantially larger in area than the optical element, which allows for simple mechanical construction of the module. However, in some instances, since the second substrate has no optical function, and does not undergo expensive fabrication processes, the cost is very low, even for a large area.

Figure 1:
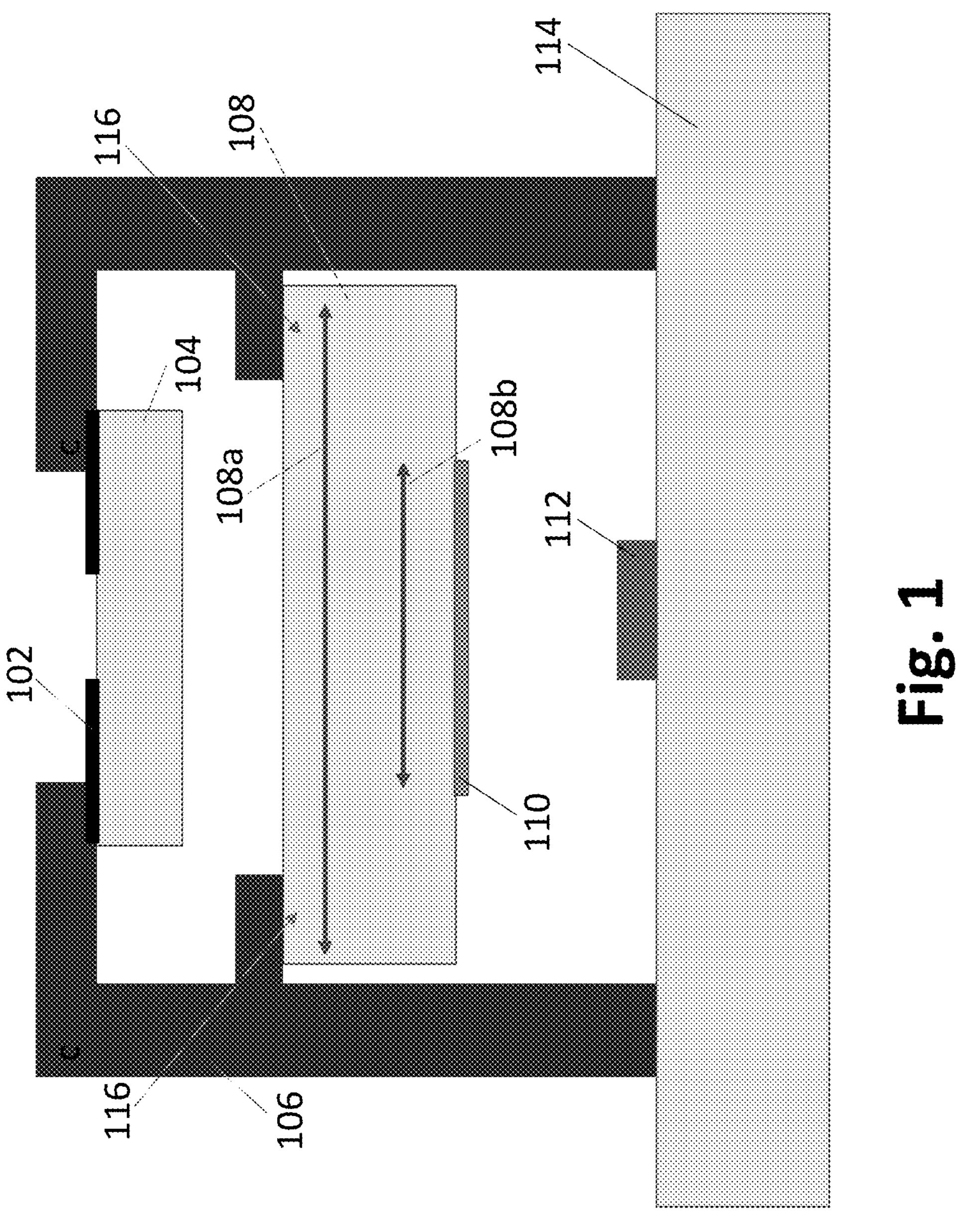
FIG. 1 illustrates an example optical module with a metasurface chip.

FIG. 1 illustrates an example optical module with a metasurface chip. The optical module may include an opaque entrance 102 (e.g. aperture). A cover glass 104 may be positioned below the opaque entrance 102. The opaque entrance 102 may be integrated within a housing 106. A metasurface chip 108 may be integrated below the cover glass 104. The metasurface chip 108 includes an optical element/chip area 108*a* which may include an optically active area 108*b*. The bottom surface of the metasurface chip 108 includes an optically active surface 110 which overlaps the optically active area 108*b*. A light emitter (e.g. a laser) or a light detector 112 (e.g. an image sensor) may be positioned to emit radiation to or receive radiation from the metasurface chip 108. The light emitter or light detector 112 may be positioned on a substrate 114 (e.g. PCB, ceramic, flex circuit, etc). As illustrated, the metasurface chip 108 extends across the entire housing 106 which make the chip area much larger than the optically active area. The extra border area 116 for the metasurface chip 108 may be used to allow the metasurface chip 108 to fit in the housing 106. However, this extra border area 116 may increase the wasted area of the metasurface chip 108.

Figure 2:
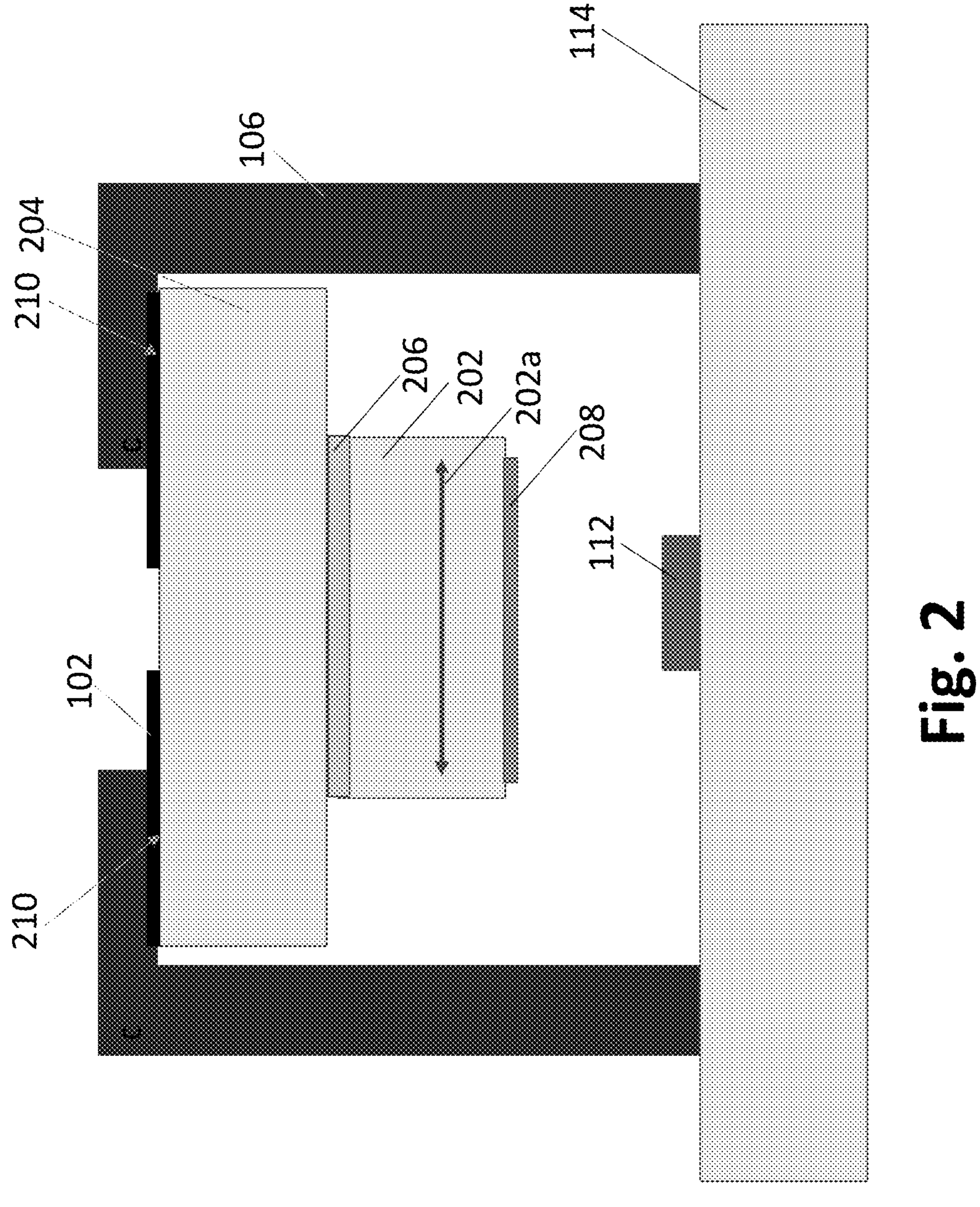
FIG. 2 illustrates an optical module with a metasurface chip in accordance with an embodiment of the invention.

FIG. 2 illustrates an optical module with a metasurface chip in accordance with an embodiment of the invention. The optical module may be a metasurface module. FIG. 2 shares many identically labeled components to the device disclosed in FIG. 1. The description from FIG. 1 are applicable to FIG. 2 and these descriptions will not be repeated in detail. In FIG. 2, a metasurface chip 202 may be mounted on a secondary substrate 204 which may extend across the entire housing 106. The secondary substrate 204 may be mounted to a border region 210 of the housing 106. The metasurface chip 202 may be mounted to the secondary substrate 204 through an optically transparent bond 206. The metasurface chip 202 has an optically active area 202*a* which is only marginally smaller than the size of the metasurface chip 202 resulting in minimal wasted area. Thus, the metasurface chip 202 has minimal border region. Mounting the metasurface chip 202 to a secondary substrate 204 may be much less expensive than the wasted extra border of the metasurface chip 202. The secondary substrate 204 allows the metasurface chip 202 to be properly mounted within the housing 106. The secondary substrate 204 laterally extends from all sides of the metasurface chip 202 to completely surround the metasurface chip 202. The metasurface chip 202 includes an optically active surface 208 which receives light from the light emitter or the light detector 112. The optically active surface is opposed to the surface bonded by the optically transparent bond 206 to the secondary substrate 204.

Figure 3:
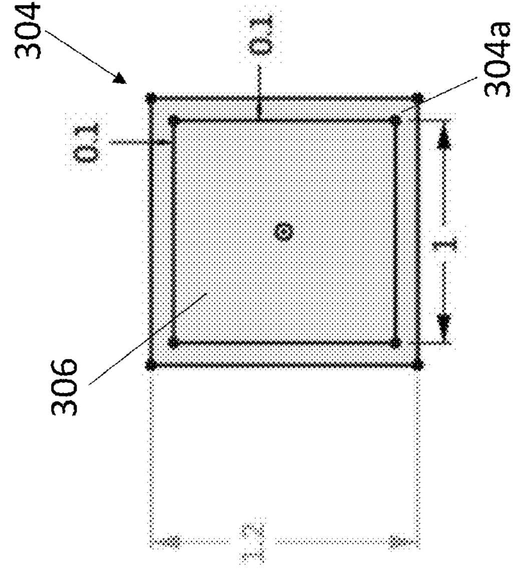
FIG. 3 is a comparison between the metasurface chip of FIG. 1 and the metasurface chip of FIG. 2.
Figure 3:
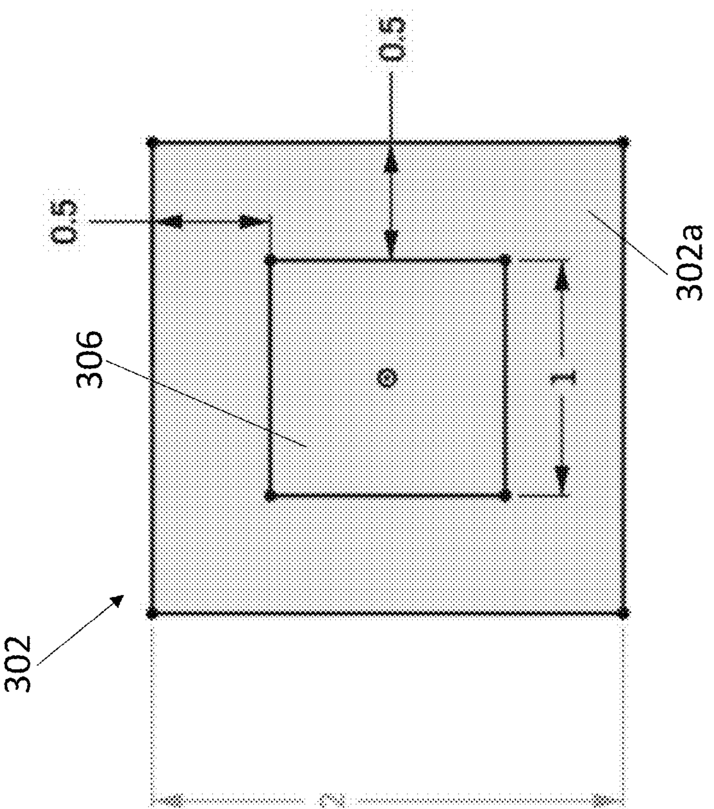

FIG. 3 is a comparison between the metasurface chip 302 of FIG. 1 and the metasurface chip 304 of FIG. 2. As illustrated, the metasurface chip 302 of FIG. 1 is much larger than the metasurface chip 304 of FIG. 2 which would make it much more expensive to manufacture while both of the chips are functionally similar. On the same wafer size, many more optical elements may be manufactured with the design of metasurface chip 304 of FIG. 2 when compared to the design of the metasurface chip 302 of FIG. 1.

For the metasurface chip 302 of FIG. 1, an optically active area 306 may be 1×1 mm; the optic element size may be 2×2 mm; an optic element area 302*a* may be 4 $mm^2$; the estimated optical elements per 300 mm wafer may be 16,184. For the metasurface chip 304 of FIG. 2, an optically active area 306 may be 1×1 mm; the optic element size may be 1.2×1.2 mm; an optic element area 304*a* may be 1.4 $mm^2$; the estimated optical elements per 300 mm wafer may be 45,212. Thus, for the same functional optically active area and thus the same functionality, the metasurface chip 304 of FIG. 2 may be fabricated on a much smaller footprint which leads to much more optical elements per wafer.

Various embodiments of the invention include various methods of fabrication of the metasurface chip mounted on the secondary substrate. For example, a first method includes a die-to-die process. In this method, the metasurface chip may be bonded to the singulated secondary substrate. This may take place during module assembly, or alternatively the bonding could be considered part of the full optical element fabrication.

Further, a second method may include a die-to-wafer process. In this method, a plurality of singulated optical elements are bonded (one-by-one or in combination) to a single large secondary substrate (e.g. a wafer). After all optical elements are bonded to the secondary substrate, it is also singulated, resulting in the final form for module assembly.

A metasurface may include nanostructured elements formed on a wafer. In some cases, it may be desired to fabricate the nanostructured elements on a silicon wafer and then transfer the nanostructure elements to a transparent (e.g. glass) wafer. Methods of transfer include wafer-to-wafer bonding, die-to-wafer bonding, and die-to-die bonding. Die-to-wafer bonding allows for fan-out or separation of individual elements at the same time as layer transfer, which can reduce the cost of the final optical element.

An example die-to-wafer bonding process flow for a metasurface optical element includes:

Forming metasurface optical element on silicon wafer
Reducing the thickness of the silicon wafer
Dicing silicon wafer
Die-to-wafer bonding of metasurface chip to handle wafer
Removal of residual silicon wafer
Dicing of handle wafer Examples of these process flow are illustrated and described in connection with FIGS. 4-15 below.

Figure 4:
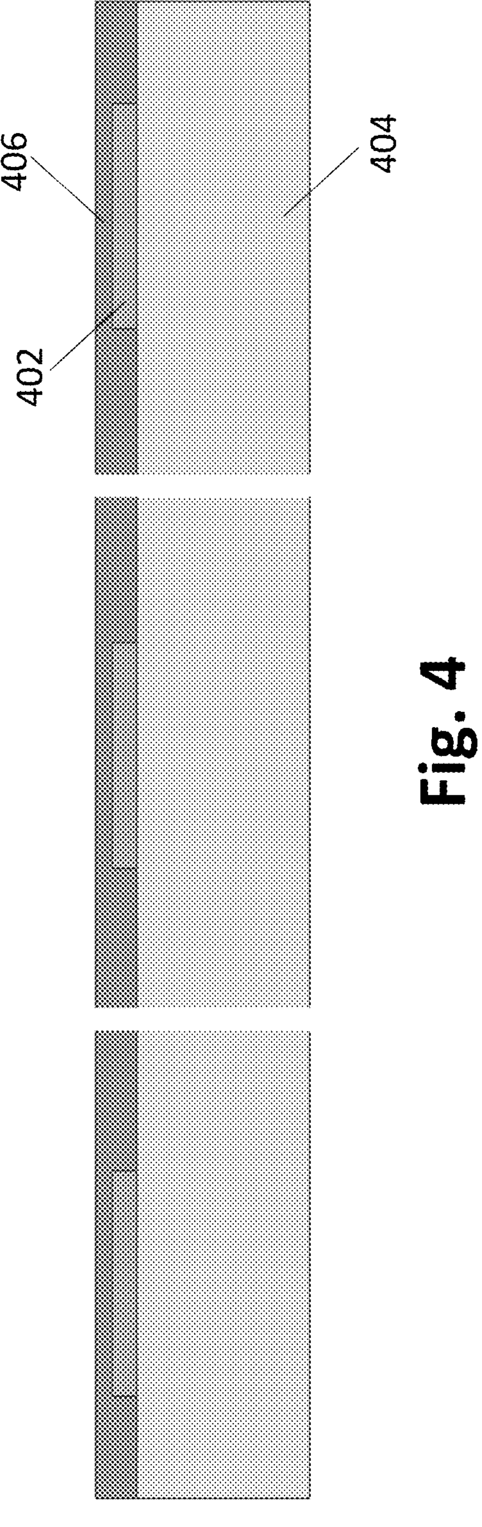
FIG. 4 illustrates an example final structure of metasurface elements formed on a glass handle wafer after a die-to-wafer bonding process in accordance with an embodiment of the invention.

FIG. 4 illustrates an example final structure of metasurface elements formed on a glass handle wafer after a die-to-wafer bonding process in accordance with an embodiment of the invention. As illustrated, a metasurface element 402 is manufactured on a glass handle wafer 404. The metasurface element 402 may be embedded within an encapsulant 406.

Figure 5:
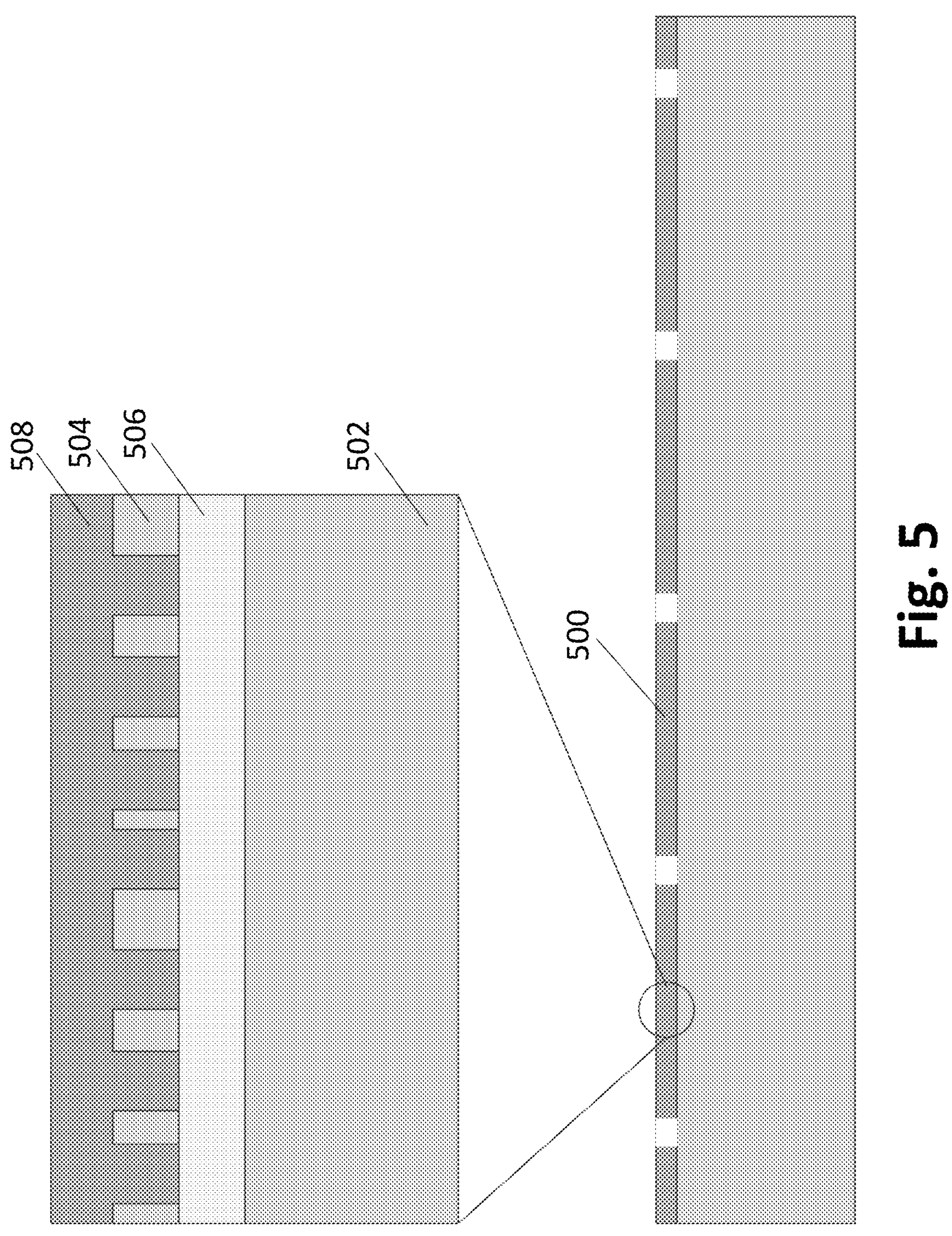
FIG. 5 illustrates an example metasurface device including structure of metasurface optical elements formed on a silicon wafer in accordance with an embodiment of the invention.

FIG. 5 illustrates an example metasurface device including structure of metasurface optical elements 500 formed on a silicon wafer in accordance with an embodiment of the invention. Each of the metasurface optical elements 500 includes nanostructures 504 which may be formed on a silicon substrate 502. The nanostructure 504 may include cylindrical pillars, or in other embodiments may include other cross-sectional shapes, such as for example, square, rectangle, oval, or cross, or the nanostructure may be a cylindrical or other shaped tube. The cylindrical pillars may have a 700 nm height and a diameter of 100 to 300 nm, or in other embodiments may have a height in a range from 400-900 nm, 500-800 nm, or 600-750 nm, and/or a cross-sectional diameter or dimension in a range from 100-500 nm, or 200-400 nm. The cylindrical pillars may be amorphous silicon. The nanostructures 504 may include metasurface optical elements described in U.S. Pat. Pub. No. 2019/0064532, entitled "Transmissive Metasurface Lens Integration" and filed Aug. 31, 2018, which is hereby incorporated by reference in its entirety for all purposes.

Between the nanostructure 504 and the silicon substrate 502 may be at least one etch stop layer 506 which serves to facilitate subsequent removal of the silicon substrate 502 via etching. The at least one etch stop layer 506 may include $SiO_2$. Between the nanostructure and the silicon substrate may also be one or more layers, serving as an anti-reflection coating. The nanostructure may be coated with an encapsulant 508. The encapsulant 508 may be a low index dielectric material such as $SiO_2$ and the surface of the encapsulant 508 may be planarized, using a process such as chemical mechanical polishing. Individual metasurface elements 500 may be arrayed across a wafer. In some embodiments, a gap between the metasurface elements 500 may be chosen to facilitate subsequent die singulation, via a process such as mechanical dicing, plasma etching, laser dicing, etc.

Figure 6:
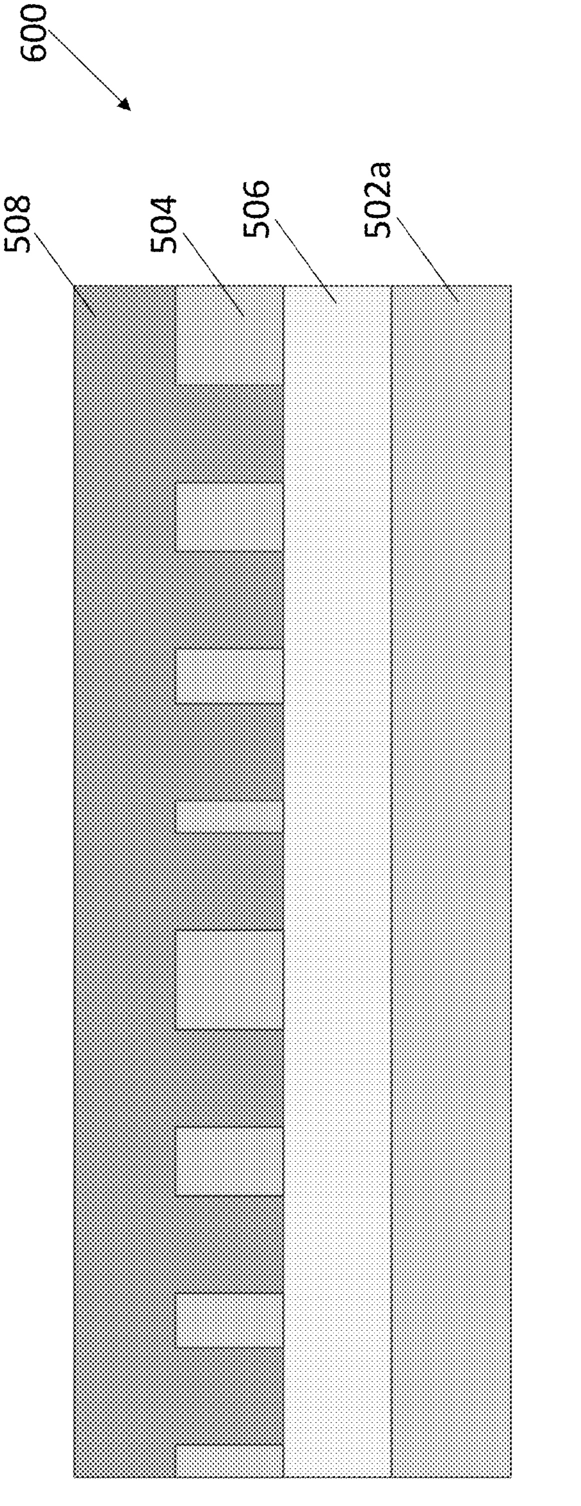
FIG. 6 illustrates the metasurface device of FIG. 5 after a reduction of the thickness of the silicon wafer in accordance with an embodiment of the invention.

FIG. 6 illustrates the metasurface device 600 of FIG. 5 after a reduction of the thickness of the silicon wafer in accordance with an embodiment of the invention. The silicon substrate 502 upon which the nanostructure is formed may be a standard silicon substrate thickness, such as 775 μm for a 300 mm diameter silicon wafer. After formation of the nanostructure 504 and subsequent encapsulation and planarization, the silicon substrate 502 may be thinned, using a process such as grinding, lapping, etching to form a thin silicon substrate 502*a*. The substrate 502 may be thinned to a residual thickness which is suitable for subsequent etching (e.g. 50 μm).

Figure 7:
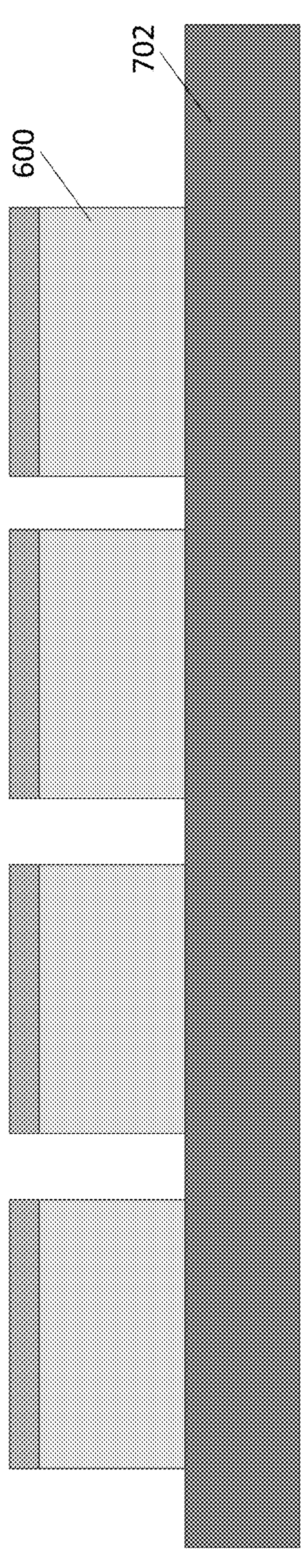
FIG. 7 illustrates the metasurface device of FIG. 6 after dicing the thinned silicon wafer in accordance with an embodiment of the invention.

FIG. 7 illustrates the metasurface device 600 of FIG. 6 after dicing the thinned silicon wafer in accordance with an embodiment of the invention. The metasurface device 600 formed of the thinned silicon wafer containing the metasurface optical elements may be singulated into individual chips using a cutting process such as mechanical dicing, plasma etching, laser dicing, or other such process. After dicing the wafer, the metasurface devices 600 may be mounted on dicing tape. The metasurface device 600 may form individual die.

Figure 8:
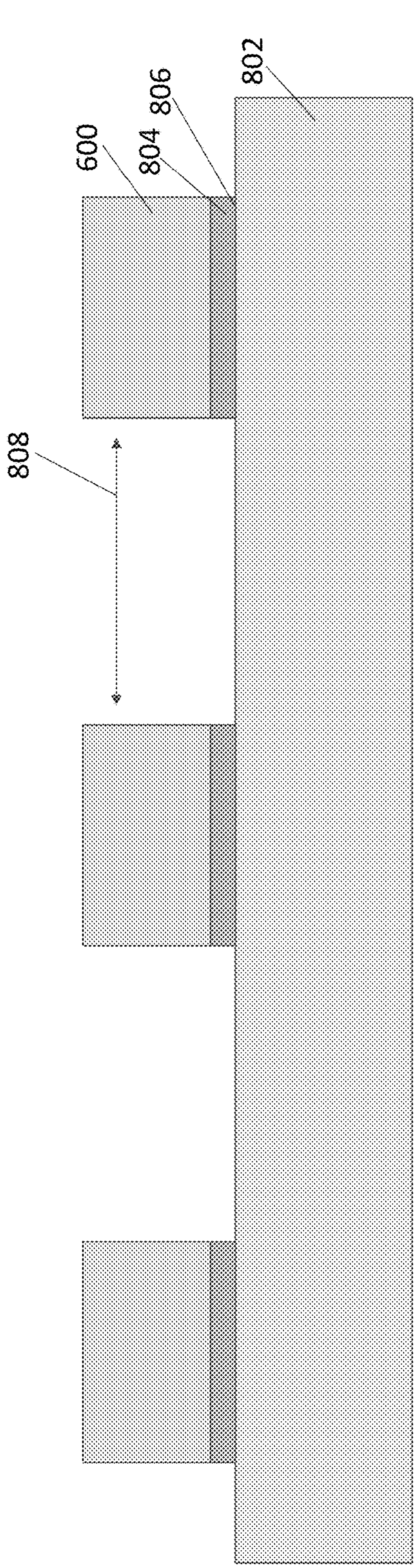
FIG. 8 illustrates an example of the metasurface device of FIG. 7 after transferring the thin silicon wafer onto a handle wafer in accordance with an embodiment of the invention.

FIG. 8 illustrates an example of the metasurface device of FIG. 7 after transferring the thin silicon wafer onto a handle wafer in accordance with an embodiment of the invention. The individual die 600 may be transferred individually or in a group from dicing tape onto a new wafer 802 (e.g. a handle wafer). The handle wafer 802 (e.g. glass) may be chosen to be transparent to the wavelength of light at which the optical element operates (e.g. 940 nm). The properties of the glass wafer 802 may be chosen such that certain mechanical properties (e.g. coefficient of thermal expansion) match those properties of the individual die 600. For example, the handle wafer 802 may be a glass material such as Corning Eagle XG and Schott BF33 which are suitable as they have similar coefficient of thermal expansion (CTE) to silicon. The thickness of the handle wafer 802 may be chosen to meet the optical and mechanical properties of the final optical element, such that no further thinning of the handle wafer may be performed (e.g. 300 μm). The handle wafer 802 may include deposited layers on one or both sides, including anti-reflection coatings, conductive layers (patterned or un-patterned) such as indium tin oxide, light absorbing, and/or light blocking layers (patterned or unpatterned). Such deposition and patterning may occur before or after the die-to-wafer bonding. The spacing 808 between the individual die 600 may be such that the final optical element size meets requirements for mechanical assembly into a module. The final die size may be substantially larger than the metasurface size. The individual die may be transferred to the handle wafer 802 using a Die-to-Wafer bonding process. The transfer may be performed using pick-and-place equipment. The bond between the individual die 600 and the handle wafer 802 may be formed using many different processes, including adhesive bonding, direct $SiO_2$-to-$SiO_2$ bonding, anodic bonding, or thermocompression bonding. In the case of $SiO_2$-to-$SiO_2$ bonding, the surfaces of the individual die 600 and the handle wafer 802 may be activated using plasma, wet chemistry, or a combination of both. In the case of $SiO_2$-to-$SiO_2$ bonding, the surfaces of the wafers may have been coated with an appropriate bonding layer (e.g. $SiO_2$) and polished in order to reduce the average surface roughness to <1 nm. In some embodiments, the average surface roughness may be <0.5 nm. After the individual dies 600 are transferred to the handle wafer 802, the bond strength may be increased using a curing, annealing, or related step which may include pressure, temperature, and/or UV radiation. The metasurface nanostructure layer 804 may face the handle wafer 802 such that the metasurface nanostructure layer 804 is closer to the handle wafer 802 than the silicon substrate. There may be a bond interface 806 between the individual die 600 and the handle wafer 802. The individual die 600 may be mounted on the handle wafer 802 to completely overlap the handle wafer 802.

Figure 9:
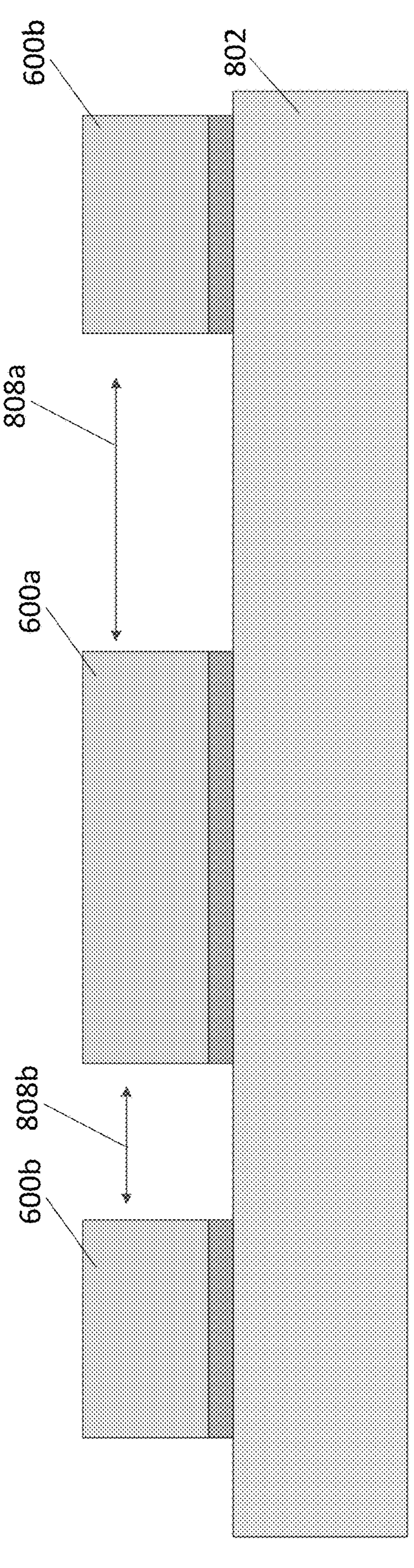
FIG. 9 illustrates another example of the metasurface device of FIG. 7 after transferring the thin silicon wafer onto a handle wafer in accordance with an embodiment of the invention.

FIG. 9 illustrates another example of the metasurface device of FIG. 7 after transferring the thin silicon wafer onto a handle wafer in accordance with an embodiment of the invention. A further embodiment of the die to wafer bonding process includes bonding multiple different individual chips from the same or separate silicon wafer onto a single handle wafer. In this embodiment, a first individual chip 600*a* of type 1 and a second individual chip 600*b* of type 2 may be transferred to the same handle wafer 802. Type 1 and Type 2 individual chips may be different in size, shape, or optical functionality. For example, the Type 1 chip may be designed for transmitted light applications, and Type 2 may be designed for received light application. Alternatively, the Type 1 and the Type 2 may be both designed for transmitted (or received) light applications, though the designs may differ. For example, the Type 1 chip may be designed for a dot pattern projector and the Type 2 chip may be designed for a diffuser. There may be different chip spacing for each chip. For example, a first chip spacing 808*a* may separate the first individual chip 600*a* and the second individual chip 600*b* and a second chip spacing 808*b* may also separate the first individual chip 600*a* and the second individual chip 600*b*.

Figure 10:
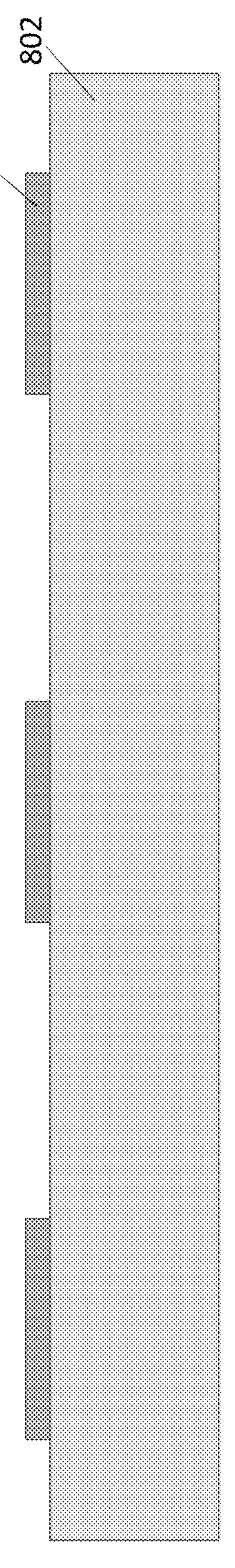
FIG. 10 illustrates an example of the metasurface device of FIG. 8 or FIG. 9 after removal of the remaining silicon wafer.

FIG. 10 illustrates an example of the metasurface device of FIG. 8 or FIG. 9 after removal of the remaining silicon wafer. After bonding of the individual die 600 to the handle wafer 802, the remaining silicon substrate may be removed using a process including wet chemical etching, plasma etching (including reactive ion etching), or a combination. The removal method may include etch selectivity between silicon and the etch stop layer. The etch selectivity may be high, at least >10:1 or >100:1 so that the nanostructure layer is not damaged and not inadvertently removed during etching. Further, the exposed surface of the handle wafer 802 and any exposed coatings may have a high etch selectivity to the silicon removal process, at least 10:1 or at least 100:1. Thus the metasurface nanostructure layer 804 may remain on the handle wafer 802 while the silicon wafer may be removed.

Figure 11:
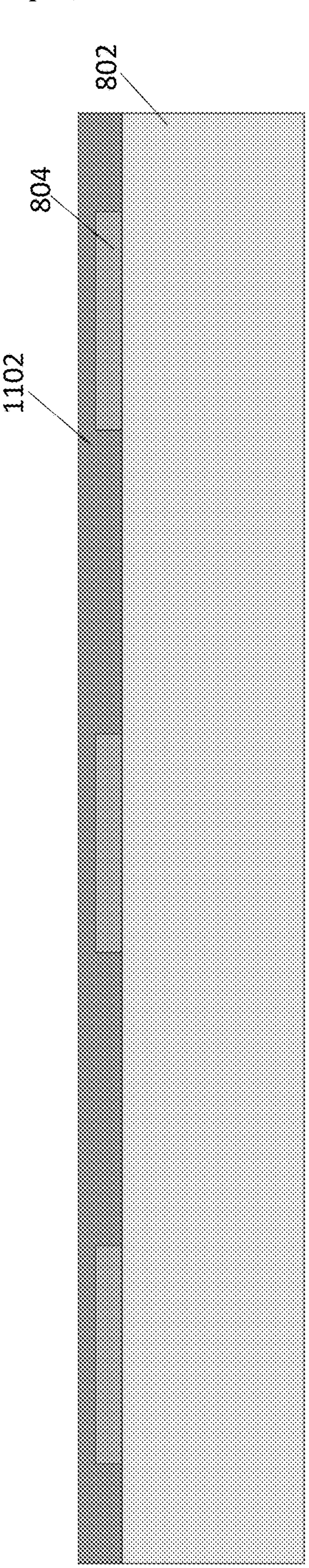
FIG. 11 illustrates an example of the metasurface device of FIG. 10 after an optional coating/pattern/encapsulation wafer.

FIG. 11 illustrates an example of the metasurface device of FIG. 10 after an optional coating/pattern/encapsulation wafer. After removal of the residual silicon substrate, a coating 1102 may be deposited on the exposed nanostructure 804. The coating 1102 may include deposited layers to reduce moisture penetration of the nanostructure, anti-reflection coatings, conductive layers (patterned or un-patterned) such as indium tin oxide, light absorbing, and/or light blocking layers (patterned or unpatterned).

Figure 12:
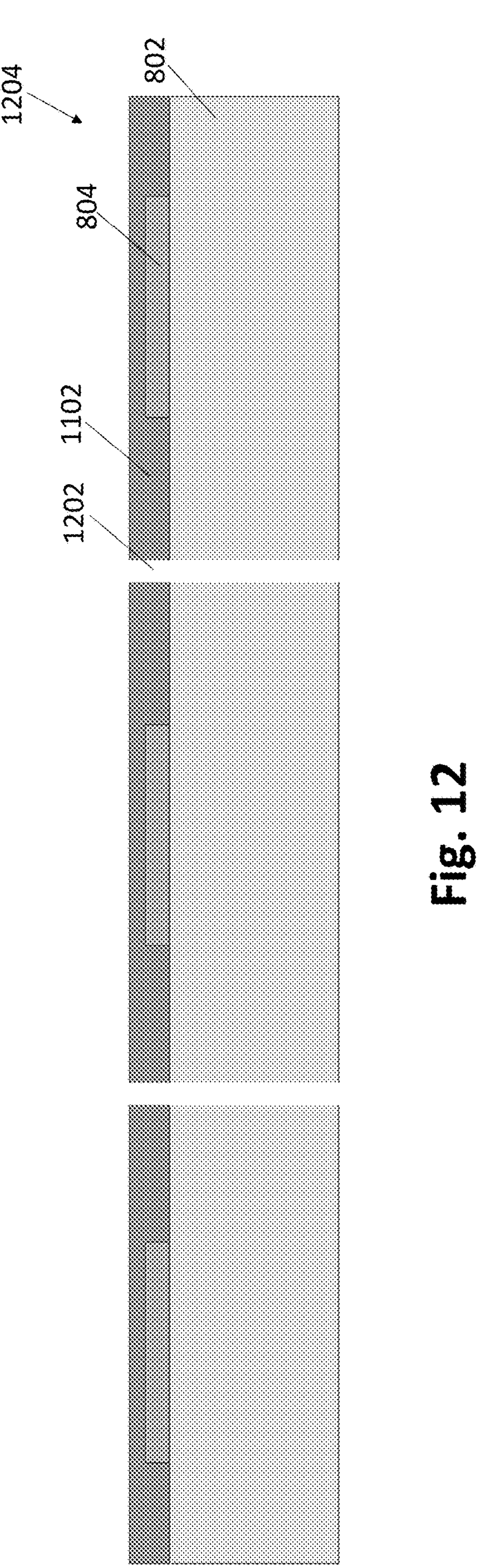
FIG. 12 illustrates an example of the metasurface device of FIG. 11 after dicing the handle wafer.

FIG. 12 illustrates an example of the metasurface device of FIG. 11 after dicing the handle wafer. The diced elements 1204 may be the final individual optical elements. Gaps 1202 may exist between the diced elements 1204. Final process step may include singulating the handle wafer by dicing the handle wafer into individual optical elements. In some embodiments, the individual optical elements 1204 may contain one metasurface chip, or multiple metasurface chips (e.g. one or more Type 1 chip(s) and one or more Type 2 chip(s) or additional chip types).

Figure 13A:
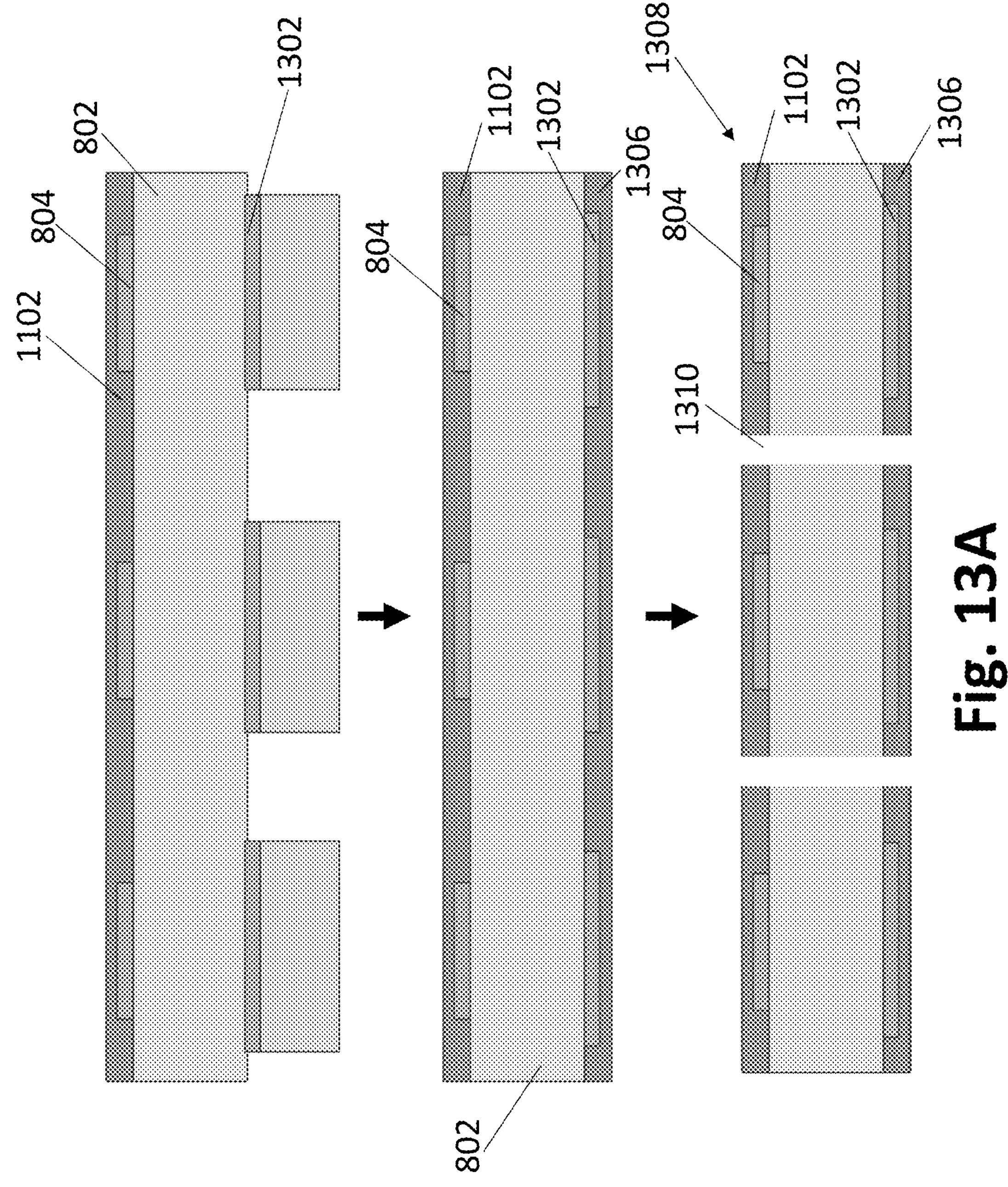
FIG. 13A illustrates an example of the metasurface device of FIG. 11 after formation of multiple optical elements.

FIG. 13A illustrates an example of the metasurface device of FIG. 11 after formation of multiple optical elements. The method of metasurface formation using die-to-wafer bonding described above in connection with FIGS. 8-11 can be repeated to form a metasurface optical element 1302 containing functional metasurfaces on both sides of the handle wafer 802. For example, before dicing, the handle wafer 802 may have metasurface elements 804 transferred to its first side and may have additional metasurface elements 1302 bonded to its second side, and those metasurface elements 1302 may be aligned to the metasurface elements 804 formed on the first side. The metasurface elements 804 on the first side may have different size, shape, and optical functionality as the metasurfaces 1302 on the second side. Similar to the metasurface elements 804 on the first side, a coating 1306 may be applied to the metasurfaces 1302 on the second side. As with FIG. 11, after die-to-wafer bonding and silicon removal on the second side of the handle wafer, the handle wafer 802 may be singulated into individual optical elements 1308. Gaps 1310 may be formed between adjacent optical elements 1308. The gaps 1310 may separate metasurface elements 804 on one side of the handle wafer 802 and metasurface elements 1302 on the other side of the handle wafer 802.

Figure 13B:
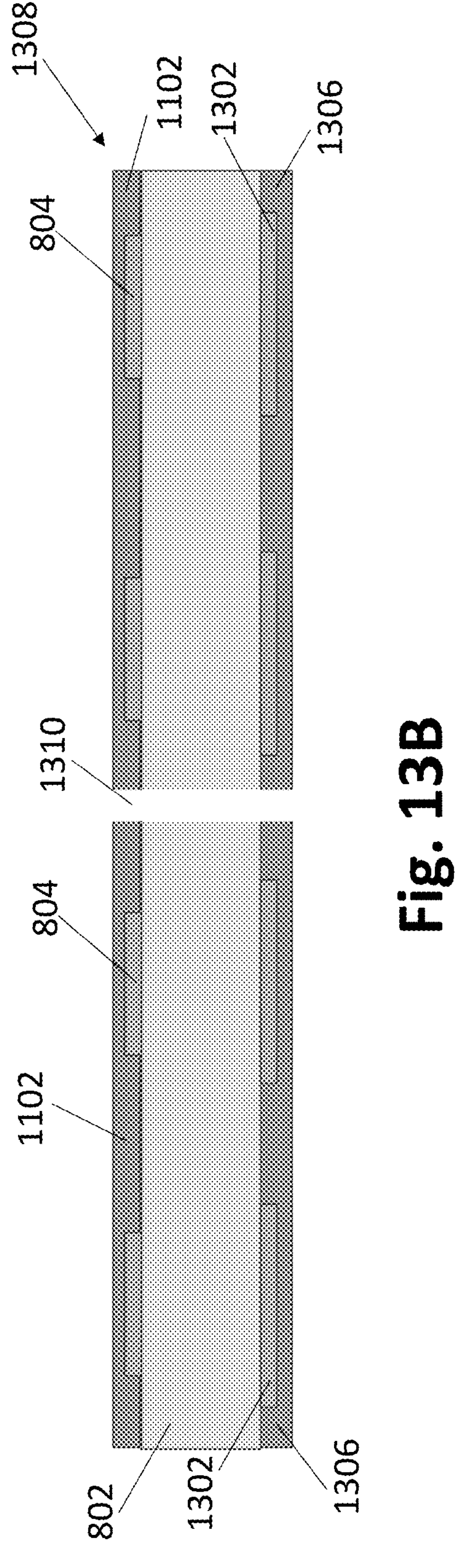
FIG. 13B illustrates an example resultant metasurface device where the metasurface elements include multiple metasurface elements on each side of the handle wafer after dicing.

In some embodiments, the gaps may be between multiple metasurface elements 804, 1302 on each side of the handle wafer after dicing, leaving multiple metasurface elements 804, 1302 on each side of the individual diced elements. FIG. 13B illustrates an example resultant metasurface device where the metasurface elements 1306 include multiple metasurface elements 804, 1302 on each side of the handle wafer 802 after dicing. The metasurface device shares identically labeled elements of FIG. 13A and the description in connection with FIG. 13A is applicable and is not repeated. As illustrated, each side of the handle wafer 802 includes multiple metasurface elements 804, 1302 separated by the gap 1310. In some embodiments, one side may include multiple metasurface elements separated by the gap 1310 and another side may only include a single metasurface element separated by the gap 1310.

Figure 14A:
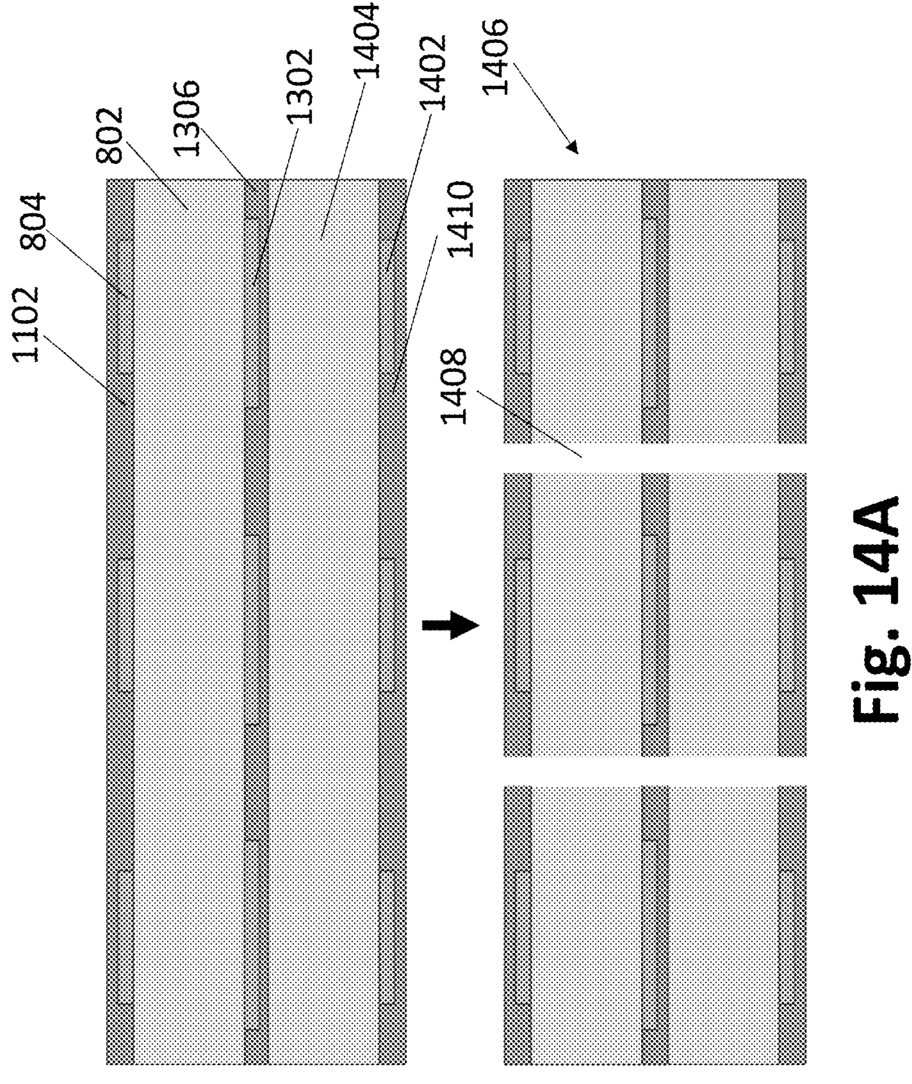
FIGS. 14A and 14B illustrate examples of a metasurface device including stacked handle wafers.
Figure 14B:
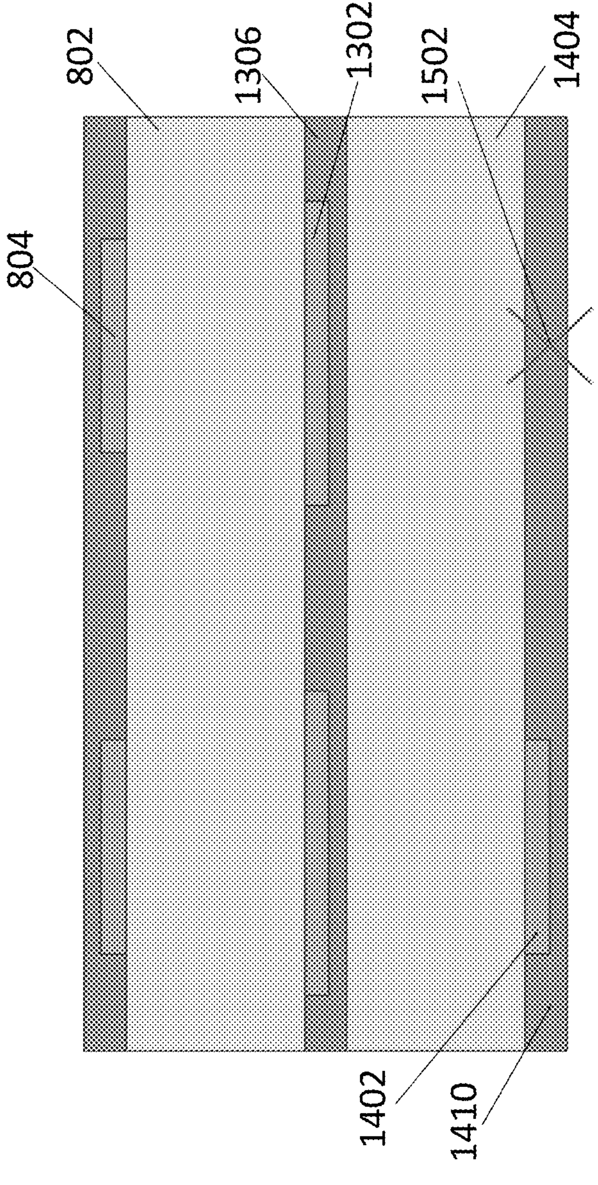

FIGS. 14A and 14B illustrate examples of a metasurface device including stacked handle wafers. As illustrated, the metasurface device is fabricated similarly to the method illustrated in FIG. 13A however this metasurface device is stacked to include more than two metasurface elements prior to singulating the handle wafer 802. FIG. 14A illustrates a single function optic stack in accordance with an embodiment of the invention. As illustrated, prior to singulation, another handle wafer 1404 may be bonded to the coating 1306. Metasurface elements 1402 may be positioned on the other handle wafer 1404. Another coating 1410 may be positioned on the metasurface elements 1402. The device may be singulated into multiple individual chips 1406 with gaps 1408 between adjacent individual chips 1406.

FIG. 14B illustrates a multi-function adjacent optical stack in accordance with an embodiment of the invention. The multi-function adjacent optical stack may have missing metasurface elements in different locations. Similar to the device of FIG. 14A, another handle wafer 1404 may be bonded to the coating 1306. Metasurface elements 1402 may be positioned on the other handle wafer 1404 with another coating 1410 positioned on the metasurface elements 1402. In the device of FIG. 14B, there are positions 1502 where metasurface elements 1402 may be absent. After singulation, there may be individual chips which include different functionality to other individual chips.

In some cases, it may be desirable to add certain features to the other handle substrate 1404, including but not limited to: Opaque optical aperture (f-stop); Anti-reflection coating; Optical filter coatings (e.g. high-pass, low-pass, band-pass, etc); and/or Electrical circuit and/or conductive layers for eye safety. In such cases it may be necessary to align the optical element with patterned features on the other handle substrate 1404. In some embodiments, at least some of the coatings may be placed on the metasurface chip. For example, some coatings may be on the other handle substrate 1404 and some coating may be on the metasurface chip.

Figure 15:
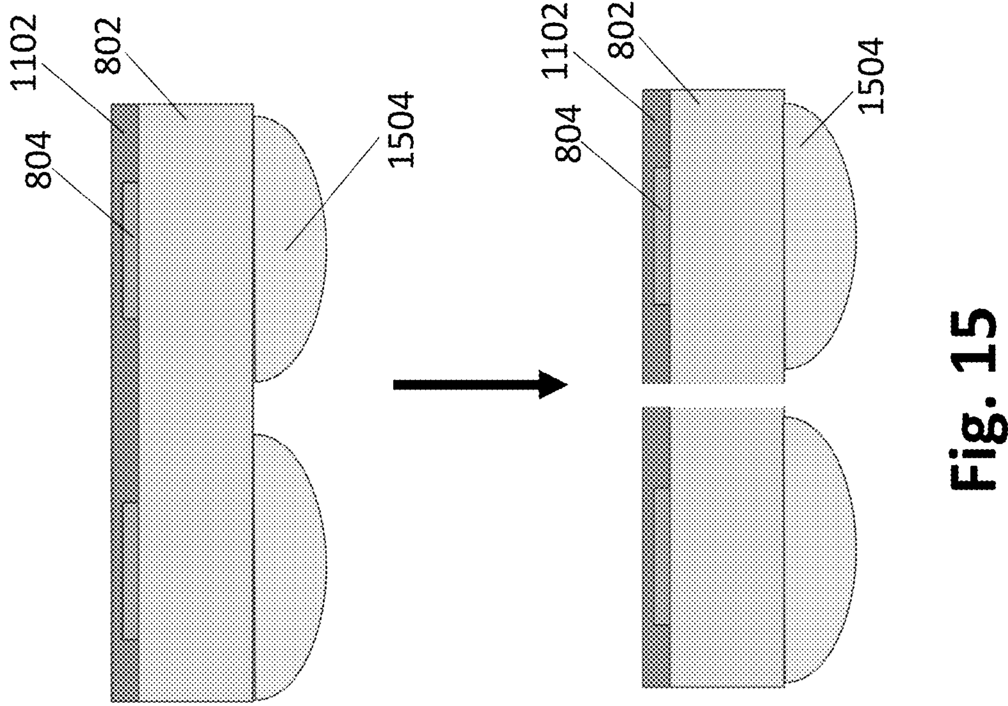
FIG. 15 illustrates the metasurface device of FIG. 11 including a bonded traditional refractive lens on one side of the handle wafer.

FIG. 15 illustrates the metasurface device of FIG. 11 including a bonded traditional refractive lens on one side of the handle wafer 802. As illustrated, a refractive lens 1504 may be bonded to the side of the handle wafer 802 opposite to the metasurface elements 804. Similar to FIG. 12, the handle wafer 802 may be singulated including the die-to-wafer bonding of the refractive lens 1504 on one side of the handle wafer 802, creating a hybrid metasurface-refractive optical element. In some embodiments, a multi-function adjacent optic stacks may be created including traditional optics similar to what is described in connection with FIG. 14B.

Embodiments Including Polymer Packaging

Embodiments of this disclosure include a process flow for encasing the optical element chip into a polymer packaging. The process may include a first step including create a "reconstructed wafer." This may be achieved by first creating a wafer of optical elements, chip size only marginally larger than active optical area. Next, the wafer may be singulated into individual chips. Next, the individual chips may be transferred individually using a pick-and-place technique.

Figure 16:
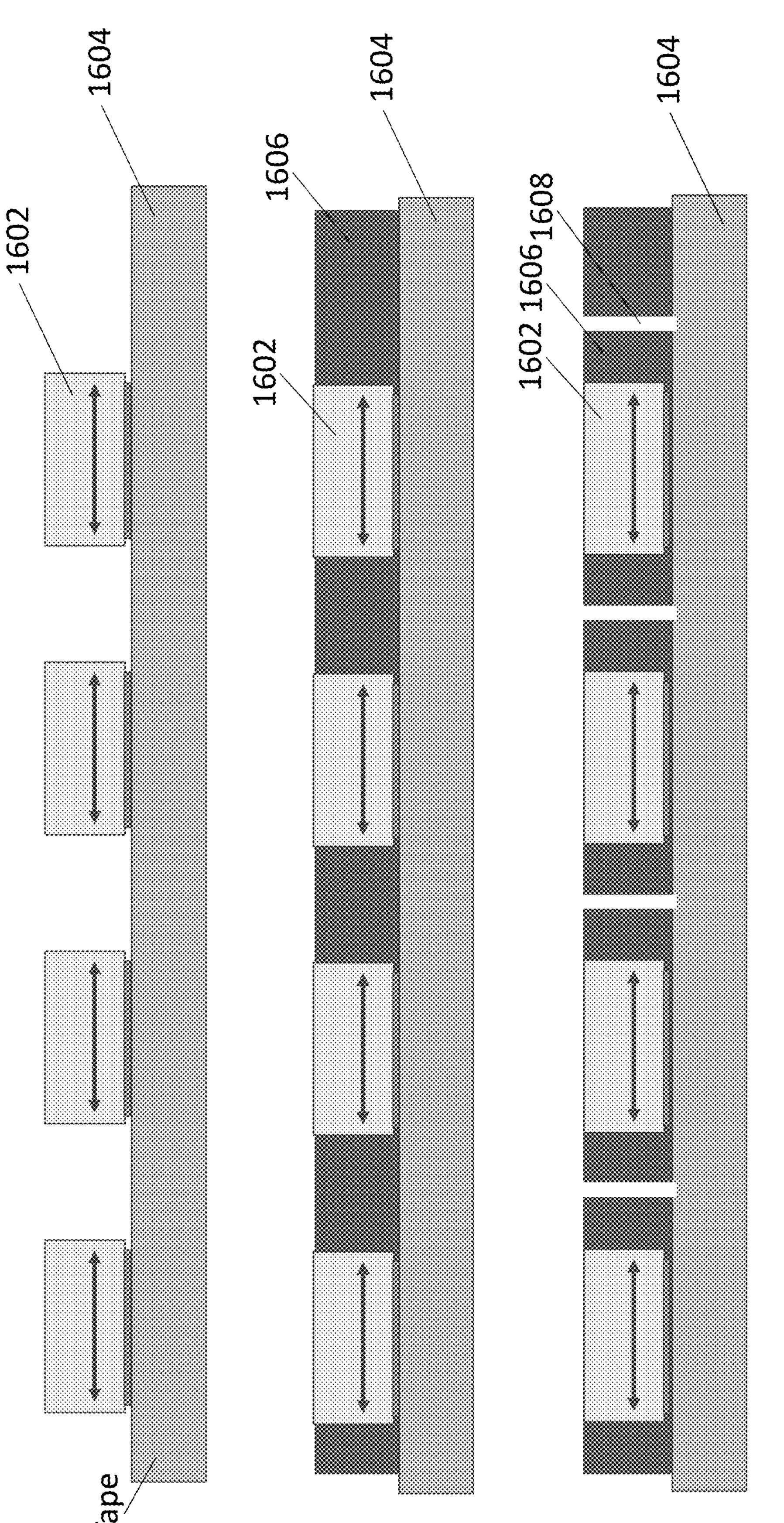
FIG. 16 illustrates the example steps of the polymer packaging to fabricate metasurface chips.
Figure 17:
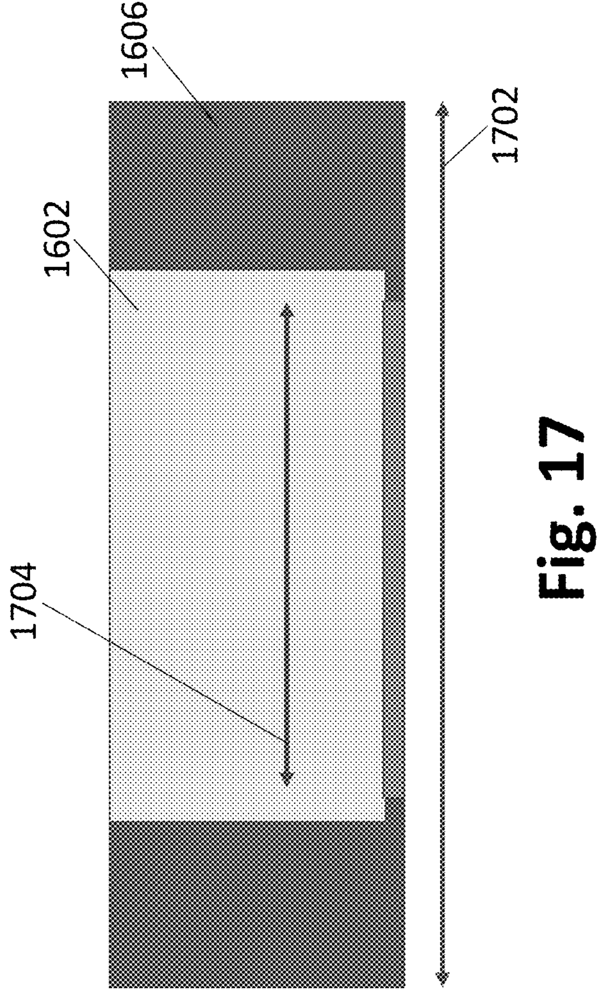
FIG. 17 illustrate the resultant polymer packaged metasurface chip after the process of FIG. 16.

FIG. 16 illustrates the example steps of the polymer packaging to fabricate metasurface chips. In a first step, the "Reconstructed Wafer" is created on a tape 1604, with sufficient space between optical elements 1602. In a second step, a backfilling space between optical elements 1602 may be filled in with a polymer material 1606, coplanar with top surface of the optical elements 1602. In some embodiments, coatings may be applied after backfilling with polymer material 1606 as described above. In a third step, individual components are singulated, resulting in gaps 1608 between the individual components. The individual components may be a larger size than original optical element 1602 which may be the proper dimension to mount within the housing of the optical device. The individual components may be removed from the tape 1604 after the are singulated as illustrated in FIG. 17.

Importantly, the distance between the elements in the reconstructed wafer is substantially larger than in the original optical element 1602. The optical elements 1602 may be placed on a substrate 1604 such as a tape. Next the region between the optical elements may be back-filled with a polymer 1606 (e.g. hard plastic). The surface of the polymer 1606 may be co-planar with the surface of the optical element. Importantly, for optical elements, the polymer 1606 may block light from entering and/or exiting the optical elements 1602 and thus the co-planar configuration of the polymer 1606 allows the polymer not to block the light entering from the top of the element, for example from peripheral angles.

In some embodiments, it may be desirable to add certain coatings to the surface of the optical elements, including but not limited to: Opaque optical aperture (f-stop); Anti-reflection coating; Optical filter coatings (high-pass, low-pass, band-pass, etc); electrical circuit; and/or conductive layers for eye safety.

Next the reconstructed wafer may be singulated to form individual optical elements 1602 surrounded in the polymer material 1606, which may be now substantially larger than the original optical element 1602. Thus, the optical elements 1602 including the polymer material 1606 may be the right dimension to mount within the housing of the optical device as illustrated in FIG. 2. The polymer material 1606 may be mounted to directly contact the housing while the optical elements 1602 do not contact the housing.

FIG. 17 illustrate the resultant polymer packaged metasurface chip after the process of FIG. 16. As illustrated, the resultant final chip size 1702 including the polymer packaging is larger than the optical element/chip area 1704 which is only marginally larger than the optically active surface of the metasurface chip 1602. Thus, this saves chip space while still allowing the resultant metasurface chip size 1702 to be large enough to fit the opening of the housing of the optical module (e.g. see FIG. 2) while still conserving chip space. Thus, the metasurface chip 1602 may fit in the housing without wasted chip space which may make the process of manufacturing the metasurface chip 1602 less expensive.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A metasurface module comprising:

a secondary substrate; and a metasurface chip mounted on the secondary substrate, wherein the secondary substrate laterally extends from all sides of the metasurface chip to completely surround the metasurface chip; and wherein the secondary substrate is coated with a coating; wherein the coating includes patterned features and the metasurface chip is aligned with the patterned features.

2. The metasurface module of claim 1, wherein the coating is at least one selected from the group consisting of: an opaque optical aperture, an anti-reflection coating, an optical filter coating, an electrical circuit, and a conductive layer.

3. The metasurface module of claim 2, wherein the optical filter coating comprises at least one selected from the group consisting of: a high-pass coating, a low-pass coating, and a band-pass coating.

4. The metasurface module of claim 2, wherein the conductive layer is configured to provide eye safety.

5. The metasurface module of claim 1, wherein the metasurface chip is mounted to the secondary substrate by an optically transparent bond.

6. The metasurface module of claim 1, further comprising a housing, wherein the secondary substrate is mounted to the housing.

7. A metasurface module comprising a metasurface chip completely surrounded by a polymer material; wherein the metasurface chip is coated with a coating; wherein the coating includes patterned features and the metasurface chip is aligned with the patterned features.

8. The metasurface module of claim 7, wherein the polymer material is coplanar with a top surface of the metasurface chip.

9. The metasurface module of claim 7, wherein the coating is at least one selected from the group consisting of: an opaque optical aperture, an anti-reflection coating, an optical filter coating, an electrical circuit, and a conductive layer.

10. The metasurface module of claim 9, wherein the optical filter coating comprises at least one selected from the group consisting of: a high-pass coating, a low-pass coating, and a band-pass coating.

11. The metasurface module of claim 9, wherein the conductive layer is configured to provide eye safety.

12. The metasurface module of claim 7, further comprising a housing, wherein the metasurface chip is mounted to the housing through the polymer material.

* * * * *